United States Patent Office 2,913,815
Patented Nov. 24, 1959

2,913,815

WELDING WIRE FOR LOW ALLOY STEELS AND RESULTING WELD

Albert Muller, Watchung, and Charles R. Felmley, Jr., Livingston, N.J., assignors to Air Reduction Company, Incorporated, New York, N.Y., a corporation of New York No Drawing. Application December 26, 1957
Serial No. 705,123

4 Claims. (Cl. 29—196.1)

The invention relates to improvements in welding wire for gas-shielded electric arc welding of high yield strength and high impact resistant low alloy steels.

A wire composition suitable as an electrode for welding high yield strength, high impact resistant low alloy steels, and a method for welding with such wire is disclosed in the Rothschild and Sibley Patent 2,810,818, October 22, 1957, having the same assignee as the assignee of the present application. While the welding wire disclosed in the patent furnishes highly satisfactory results in the "as-welded" condition, the weld is embrittled when heat treated, and the mechanical properties of the workpieces or plates, particularly in impact strength, cannot be approximated at the weld.

There are certain applications for high yield strength, high impact resistant steels; for example, pressure vessels, such as heat exchangers, reactors, etc., which require that such steels and, of course, their welded zones, be capable of withstanding stress-relief-annealing, and still furnish high tensile and impact strength. Accordingly, the primary object of the invention is to provide a wire suitable for gas-shielded electric arc welding, wherein the wire furnishes a weld deposit which, despite a heat treatment, such as stress-relief-annealing, affords values of yield strength and impact resistance which will match such values of the low alloy steel workpieces.

This, and other objects and advantages of the invention will be apparent from the following detailed description of a preferred embodiment of the invention.

In accordance with the invention, the welding wire is a manganese-nickel-molybdenum alloy preferably produced in the basic electric furnace and in accordance with aircraft quality practices. The wire composition by percent weight analysis consists essentially of .13, maximum, carbon; approximately 1.70 to 2.30 manganese; .025, maximum, phosphorus; .025, maximum, sulphur; approximately .30 to .50 silicon; approximately .40 to .80 nickel; and approximately .25 to .50 molybdenum, the remainder being essentially iron.

An example of a high yield strength, high impact resistant low alloy steel suitable for fabricating a heat exchanger, reactor, or similar pressure vessel, and which may be stress-relief-annealed and still maintain its high tensile and impact properties, is a low alloy steel known as HY–80. Such steel is more particularly described in Navy Specification Mil–S–16216B. The chemical composition of this steel for plate having a weight to and including 51.0 pounds per square foot is by percent weight analysis .22 maximum, carbon; .10 to .40 manganese; .040, maximum, phosphorus; .045, maximum, sulphur; .12 to .38 silicon; 1.93 to 2.57 nickel; .84 to 1.46 chromium; and .13 to .27 molybdenum, with the remainder essentially iron. For plate having a thickness in excess of 51.0 pounds per square foot, the carbon content is a maximum of .23; the nickel content is from 2.68 to 3.32; the chromium content from 1.29 to 1.91; and molybdenum from .37 to .63. The manganese, phosphorus, sulphur and silicon contents are the same. The welding wire of the invention is particularly suitable for welding plates of HY–80 steel. It will be understood, however, that other high yeild strength, high impact resistant, heat treatable low alloy steels may also be welded with a wire of the composition set forth above; for example, a low alloy steel made in accordance with ASTM–302.

It is preferred to use the welding wire of the invention in accordance with the basic method disclosed in Muller et al., 2,504,868, April 18, 1950, and as described in the aforesaid Rothschild and Sibley patent. The diameter of the wire electrode, the shielding gas used, the rate of gas flow, the use of reverse polarity direct current, the values of current and arc voltage, rate of welding, and rate of wire feed are preferably and essentially the same as described in the Rothschild and Sibley patent.

More specifically, plates of HY–80 steel have been welded with a welding wire having a composition by percent weight analysis of .08 carbon, 1.70 manganese, .016 phophorus, .018 sulphur, .36 silicon, .56 nickel, .32 molybdenum, and the remainder essentially iron. The weld metal obtained with such welding wire has an analysis of .062 carbon, 1.52 manganese, .014 phosphorus, .019 sulphur, .34 silicon, .66 nickel, and .36 molybdenum. There is very little dilution of the weld metal with the plate.

In the as-welded condition, the weld metal furnishes a yield strength at 0.2% offset, of 94,300 pounds per square inch, which is above the corresponding tensile property of 80,000 pounds per square inch for HY–80 plate. The impact strength of the weld metal, in terms of V-notch Charpy, meets the minimum requirement for HY–80 steel, absorbing an average of at least 20 foot-pounds of energy at minus 60° F., and, of course, increases with increase in temperature.

After the described weldment is subjected to a heat treatment, such as a stress-relief-anneal at approximately 1200° F. for one hour, followed by air cooling, the yield strength remains substantially the same, being 94,000 pounds per square inch. The impact strength of the weld, however, is vastly improved by stress-relief-annealing. At minus 60° F., the weld absorbs 55 foot-pounds of energy; approximately 75 foot-pounds at minus 40° F., and approximately 90 foot-pounds at plus 20° F. This is in contradistinction to the impact strength of the weld metal obtained with the welding wire disclosed in the Rothschild and Sibley patent, which when stress-relief-annealed, loses impact strength to such an extent that only 10 foot-pounds of energy is absorbed at minus 60° F., and at minus 20° F. and plus 20° F. less than 20 and 35 foot-pounds, respectively, are absorbed.

It is believed that the advantages of the invention will be apparent from the foregoing detailed description. Our welding wire provides weldments for high yield strength and high impact resistant low alloy steels, which not only fairly match the tensile and impact properties of the steels in the as-welded condition, but additionally, furnish weldments which, when stress-relief-annealed, afford a matching value of yield strength. The impact resistance of the weld is improved by stress-relief-annealing. As a result, high yield strength and high impact resistant steels may be welded for use in heat exchangers, reactors, or the like, where high values of these mechanical properties are desired in stress-relief-annealed plates and weldments.

While a preferred embodiment of the invention has been described, it will be apparent that changes may be made without departing from the spirit and scope of the invention as set forth in the following claims.

We claim:

1. A welding wire for gas-shielded electric arc welding of low alloy, high yield strength and high impact resistant steels, and permitting heat treatment of the weld, said wire consisting essentially of .13, maximum, carbon; approximately 1.70 to 2.30 manganese; .025, maximum, phophorus; .025, maximum, sulphur; approximately .30 to .50 silicon; approximately .40 to .80 nickel; and approximately .25 to .50 molybdenum; the remainder being essentially iron.

2. A welding wire for gas-shielded electric arc welding of low alloy, high yield strength and high impact resistant steels, and permitting heat treatment of the weld, said wire consisting essentially of .080 carbon, 1.70 manganese, .016 phophorus, .018 sulphur, .36 silicon, .56 nickel, and .32 molybdenum, the remainder being essentially iron.

3. A weld for low alloy steel of high yield strength and high impact resistance, said steel having a composition containing by percent weight analysis approximately .23, maximum, carbon; .10 to .40 manganese; .040, maximum, phosphorus; .045, maximum, sulphur; .12 to .38 silicon; 1.93 to 3.32 nickel; .84 to 1.91 chromium; and .13 to .63 molybdenum; the remainder being essentially iron, the weld metal joining workpieces of such steel being deposited from a wire electrode, by percent weight analysis, consisting essentially of .13, maximum, carbon; approximately 1.70 to 2.30 manganese; .025, maximum, phosphorus; .025, maximum, sulphur; approximately .30 to .50 silicon; approximately .40 to .80 nickel; and approximately .25 to .50 molybdenum; the remainder being essentially iron, the weld being stress-relief-annealed by heating at approximately 1200° F. for one hour, followed by cooling.

4. A weld for low alloy steel of high yield strength and high impact resistance, said steel having a composition containing by percent weight analysis approximately .23, maximum, carbon; .10 to .40 manganese; .040, maximum, phosphorus; .045, maximum, sulphur; .12 to .38 silicon; 1.93 to 3.32 nickel; .84 to 1.91 chromium; and .13 to .63 molybdenum; the remainder being essentially iron, the weld metal joining workpieces of such steel being deposited from a wire electrode, by percent weight analysis, consisting essentially of .080 carbon, 1.70 manganese, .016 phosphorus, .018 sulphur, .36 silicon, .56 nickel, and .32 molybdenum, the remainder being essentially iron, the weld being stress-relief-annealed by heating at approximately 1200° F. for one hour, followed by cooling.

References Cited in the file of this patent

UNITED STATES PATENTS

| | | |
|---|---|---|
| 2,248,279 | Nepote | July 8, 1941 |
| 2,327,490 | Bagsar | Aug. 24, 1943 |
| 2,810,818 | Rothschild | Oct. 22, 1957 |